United States Patent [19]
Song

[11] Patent Number: 6,010,596
[45] Date of Patent: Jan. 4, 2000

[54] GYPSUM WOOD FIBER PRODUCT HAVING IMPROVED WATER RESISTANCE

[75] Inventor: Weixin Song, Gurnee, Ill.

[73] Assignee: United States Gypsum Company, Chicago, Ill.

[21] Appl. No.: 08/771,185

[22] Filed: Dec. 20, 1996

[51] Int. Cl.[7] ..................................................... B32B 13/02
[52] U.S. Cl. ...................... 162/158; 162/172; 162/181.3; 162/183; 106/660; 106/778; 106/780; 264/82
[58] Field of Search ..................................... 162/145, 172, 162/168.1, 158; 102/181.3, 183; 106/660, 778, 780; 264/82

[56] References Cited

U.S. PATENT DOCUMENTS

| | | | |
|---|---|---|---|
| 2,526,537 | 10/1950 | Camp | 106/780 |
| 3,822,340 | 7/1974 | Eberl et al. | 423/555 |
| 4,239,716 | 12/1980 | Ishida et al. | 264/86 |
| 4,741,773 | 5/1988 | Kuroda et al. | 106/2 |
| 4,840,688 | 6/1989 | Vogt | 156/39 |
| 5,120,355 | 6/1992 | Imai | 106/2 |
| 5,320,677 | 6/1994 | Baig | 106/780 |
| 5,437,722 | 8/1995 | Borenstein | 106/778 |

FOREIGN PATENT DOCUMENTS

| | | |
|---|---|---|
| 0 384 322 | 8/1990 | European Pat. Off. . |
| 2081242 | 8/1980 | United Kingdom . |
| 1603625 | 11/1981 | United Kingdom . |
| WO 93/04007 | 3/1993 | WIPO . |

*Primary Examiner*—Peter Chin
*Attorney, Agent, or Firm*—Donald E. Egan; David F. Janci; John M. Lorenzen

[57] ABSTRACT

An improved water resistant gypsum board is made by adding an aqueous wax emulsion containing a cationic surfactant to an aqueous slurry containing calcium sulfate and host particles at a slurry temperature which maintains calcium sulfate hemihydrate crystals. The wax emulsion is stable at the temperature of slurry which maintains the calcium sulfate hemihydrate. The slurry is then dewatered and rehydrated to form a gypsum board and dried at a temperature to melt the wax.

56 Claims, No Drawings

GYPSUM WOOD FIBER PRODUCT HAVING IMPROVED WATER RESISTANCE

The present invention relates to an improved composite material; more particularly to a composite gypsum board product having improved water resistance which is especially useful for making building products. Specifically, the present invention relates to an improved gypsum/wood fiber building board having enhanced water resistance through the addition of a wax emulsion to the gypsum and wood fiber during the board manufacturing process.

BACKGROUND AND PRIOR ART

Certain properties of gypsum (calcium sulfate dihydrate) make it very popular for use in making industrial and building products; especially gypsum wallboard. It is a plentiful and generally inexpensive raw material which, through a process of dehydration and rehydration, can be cast, molded or otherwise formed to useful shapes. It is also noncombustible and relatively dimensionally stable when exposed to moisture. However, because it is a brittle, crystalline material which has relatively low tensile and flexural strength, its uses are typically limited to non-structural, non-load bearing and non-impact absorbing applications.

Gypsum wallboard; i.e. also known as plasterboard or drywall, consists of a rehydrated gypsum core sandwiched between multi-ply paper cover sheets, and is used largely for interior wall and ceiling applications. Because of the brittleness and low nail and screw holding properties of its gypsum core, conventional drywall by itself cannot support heavy appended loads or absorb significant impact.

Accordingly, means to improve the tensile, flexural, nail and screw holding strength and impact resistance of gypsum plasters and building products have long been, and still are, earnestly sought.

Another readily available and affordable material, which is also widely used in building products, is lignocellulosic material particularly in the form of wood and paper fibers. For example, in addition to lumber, particleboard, fiberboard, waferboard, plywood and "hard" board (high density fiberboard) are some of the forms of processed lignocellulosic material products used in the building industry. Such materials have better tensile and flexural strength than gypsum. However, they are also generally higher in cost, have poor fire resistance and are frequently susceptible to swelling or warping when exposed to moisture Therefore, affordable means to improve upon these use limiting properties of building products made from cellulosic material are also desired.

Previous attempts to combine the favorable properties of gypsum and cellulosic fibers, particularly wood fibers, have had very limited success. Attempts to add cellulosic fibers, (or other fibers for that matter), to gypsum plaster and/or plasterboard core have generally produced little or no strength enhancement because of the heretofore inability to achieve any significant bond between the fibers and the gypsum. U.S. Pat. Nos. 4,328,178; 4,239,716; 4,392,896 and 4,645,548 disclose recent examples where wood fibers or other natural fibers were mixed into a stucco (calcium sulfate hemihydrate) slurry to serve as reinforcers for a rehydrated gypsum board or the like.

U.S. Pat. No. 4,734,163, teaches a process in which raw or uncalcined gypsum is finely ground and wet mixed with 5–10% paper pulp. The mash is partially dewatered, formed into a cake and further dewatered by pressure rolls until the water/solids ratio is less than 0.4. The cake is cut into green boards, which, after being trimmed and cut, are stacked between double steel plates and put into an autoclave. The temperature in the autoclave is raised to about 140° C. to convert the gypsum to calcium sulfate alpha hemihydrate. During the subsequent incremental cooling of the vessel boards, the hemihydrate rehydrates back to dihydrate (gypsum) and gives the board integrity, The boards are then dried and finished as necessary.

U.S. Pat. No. 5,320,677 to Baig describes a composite product and a process for producing the product in which a dilute slurry of gypsum particles and wood fibers are heated under pressure to convert the gypsum to calcium sulfate alpha hemihydrate. The wood fibers have pores or voids on the surface and the alpha hemihydrate crystals form within, on and around the voids and pores of the wood fibers. The heated slurry is then dewatered to form a filter cake, preferably using equipment similar to paper making equipment, and before the slurry cools enough to rehydrate the hemihydrate to gypsum, the filter cake is pressed into a board of the desired configuration. The pressed filter cake is cooled and the hemihydrate rehydrates to gypsum to form a dimensionally stable, strong and useful building board. The board is thereafter trimmed and dried. The process described in U.S. Pat. No. 5,320,677 is distinguishable from the earlier processes in that the calcination of the gypsum takes place in the presence of the wood fibers, while the gypsum is in the form of a dilute slurry, so that the slurry wets out the wood fibers, carrying dissolved gypsum into the voids of the fibers, and the calcining forms acicular calcium sulfate alpha-hemihydrate crystals in situ in and about the voids.

These prior art products, like ordinary gypsum wallboard, gypsum tile, gypsum block, gypsum casts, and the like have relatively little resistance to water. When ordinary gypsum wallboard, for example, is immersed in water. the board quickly absorbs a considerable amount of water, and loses a great deal of its strength. Actual tests have demonstrated that when a 2"×4" cylinder of gypsum board core material was immersed In water at about 70° F., the cylinder showed a water absorption of 36% after immersion for 40 minutes. Many attempts have been made in the past to improve the water resistance of gypsum products. These attempts have Included the incorporation of water-resistant material such as metallic soaps, asphalts, waxes, resins, etc., within the calcium sulfate hemihydrate slurry. They have also included attempts to coat the finished gypsum product with water resistant films or coatings. One specific example of past attempts to waterproof gypsum integrally by the addition of water-repellent substances is disclosed in U.S. Pat. No. 2,198,776 to King and Camp. This shows the incorporation of paraffin, wax, asphalt, etc. into the aqueous slurry by spraying the molten material into the slurry.

U.S. Pat. No. 2,432,963. describes the addition of an emulsion of wax, such as paraffin wax, and asphalt, in the relative proportions of from about 1 part to about 10 parts of asphalt per part of wax to the aqueous plaster slurry. Since the asphalt Is a relatively poor solvent for paraffin wax and similar wax at ordinary temperatures, the solution formed at high temperatures tends on cooling to deposit microscopic wax crystals on the asphalt-wax surface, whereby unusual water-repellent properties are secured. U.S. Pat. No. 2,526, 537 describes the addition of potassium sulfate to such a asphalt-wax combination. U.S. Pat. No. 5,437,722 also describes a paraffin wax based emulsion for use with gypsum compositions.

It is an object of the present invention to provide a gypsum-wood fiber board product having the strength and dimensional stability of the type of product described in U.S. Pat. No. 5,320,677 and having improved water resistance.

SUMMARY OF THE INVENTION

It is a principal objective of the present invention to provide a gypsum board product having improved water resistance, which is formed by combining gypsum with another substance having higher strength, such as a wood fiber, and having a wax dispersed throughout said board to provide stronger building products which have improved resistance to water and other forms of moisture.

It is a related objective to provide a process for producing such an improved gypsum board product wherein a wax emulsion is added to a heated aqueous slurry of calcium sulfate hemihydrate with another substance having higher strength, such as a wood fiber, wherein said heated wax-containing slurry is passed onto a flat, porous forming surface to form a shaped filter cake which is processed to provide the gypsum board product.

A more specific objective of the invention is to provide a paperless wallboard which has uniformly good strength, including resistance to nail and screw pull-out, throughout its expanse; which is more dimensionally stable; and which is more water resistant, i.e. it maintains its strength even on exposure to water; which is fire resistant; and which can be produced at a practical cost.

The main objectives are realized, according to the invention, by adding a wax emulsion to a heated slurry of calcium sulfate hemihydrate and a host particle of a stronger material, passing the heated slurry onto a porous flat forming surface to form a filter cake which is dewatered and pressed to form a board before the hemihydrate is completely rehydrated to gypsum. The main objectives are preferably realized, according to the invention, by adding a wax emulsion to a dilute slurry of ground gypsum which has been calcined under conditions that produce acicular alpha hemihydrate crystals in and about the voids of a host particle of a stronger material, passing the slurry to a porous flat forming surface to form a filter cake which is dewatered with minimal loss of the wax emulsion. The filter cake is pressed to form a board before the hemihydrate completely rehydrated to gypsum, after which the board is dried under conditions that melt the wax within the board. It has been found that the addition of the wax emulsion not only improves the water resistance of the board, but that the board will retain its strength and in some cases, the addition of the wax improves the strength of the product.

The term "gypsum", as used herein, means calcium sulfate in the stable dihydrate state; i.e. $CaSO_4.2H_2O$, and includes the naturally occurring mineral, the synthetically derived equivalents, and the dihydrate material formed by the hydration of calcium sulfate hemihydrate (stucco) or anhydrite. The term "calcium sulfate material", as used herein, means calcium sulfate in any of its forms, namely calcium sulfate anhydrite, calcium sulfate hemihydrate, calcium sulfate dihydrate and mixtures thereof.

The term "host particle" is meant to cover any macroscopic particle, such as a fiber, a chip or a flake, of a substance other than gypsum. The particle, which is generally insoluble in the slurry liquid, should also have accessible voids therein; whether pits, cracks, fissures, hollow cores, or other surface imperfections, which are penetrable by the slurry menstruum and within which calcium sulfate crystals can form. It is also desirable that such voids are present over an appreciable portion of the particle; it being apparent that the more and better distributed the voids, the greater and more geometrically stable will be the physical bonding between the gypsum and host particle. The substance of the host particle should have desirable properties lacking in the gypsum, and, preferably, at least higher tensile and flexural strength. A ligno-cellulosic fiber, particularly a wood fiber, is an example of a host particle especially well suited for the composite material and process of the invention. Therefore, without intending to limit the material and/or particles that qualify as a "host particle", wood fiber(s) is often used hereafter for convenience in place of the broader term.

The term "gypsum/wood fiber", which is sometimes abbreviated as "GWF", as used herein, is meant to cover a mixture of gypsum and host particles, e.g. wood fibers, which is used to produce boards wherein at least a portion of the gypsum is in the form of acicular calcium sulfate dihydrate crystals positioned in and about the voids of the host particles, wherein the dihydrate crystals are formed in situ by the hydration of acicular calcium sulfate hemihydrate crystals in and about the voids of said particles. The GWF boards are preferably produced by the process of U.S. Pat. No. 5,320,677.

The term "wax emulsion", as used herein, means an aqueous emulsion of one or more waxes which is emulsified through the use of one or more surfactants. The wax emulsion must comprise a wax or waxes adapted to provide water resistance to the finished product. The wax or waxes must be inert with respect to the gypsum and wood fibers which make up the product. The wax must be in the form of an emulsion which is stable under the temperature and pressure conditions under which the calcium sulfate alpha hemihydrate/wood fiber slurry emerges from the calcination process. More importantly, the wax emulsion not only must be stable in the presence of the various additives which are used to regulate the crystallization of the hemihydrate and the various accelerators or retarders which are used to adjust the process by which the rehydration to gypsum occurs, but the wax emulsion must not interfere with the operation of those additives. Most importantly, a high proportion of the wax must adhere to the gypsum/wood fiber particles during the process by which the slurry is dewatered to remove most of the water and a filter cake is formed, in order to avoid the loss of wax with the water removed from the slurry. The melting point of the wax must be below the core temperature achieved by the board during the final drying of the product. In the preferred embodiment, a cationic surfactant, such as a quaternary amine, is included in the wax emulsion at the time the wax emulsion is added to the hot slurry.

In the process, uncalcined gypsum and host particle are mixed together with sufficient liquid to form a dilute slurry which is then heated under pressure to calcine the gypsum, converting it to a calcium sulfate alpha hemihydrate. While the-micro-mechanics of the invention are not fully understood, it is believed that the dilute slurry menstruum wets out the host particle, carrying dissolved calcium sulfate into the voids therein. The hemihydrate eventually nucleates and forms crystals, predominantly acicular crystals, in-situ in and about the voids of the host particle. Crystal modifiers can be added to the slurry if desired. The resulting composite is a host particle physically interlocked with calcium sulfate crystals. This interlocking not only creates a good bond between the calcium sulfate and stronger host particle, but prevents migration of the calcium sulfate away from the host particle when the hemihydrate is subsequently rehydrated to the dihydrate (gypsum).

A plurality of such composite particles form a material mass which can be compacted, pressed into boards, cast, sculpted, molded, or otherwise formed into desired shape prior to final set. After final set, the composite material can be cut, chiseled, sawed, drilled and otherwise machined.

Moreover, it exhibits the desirable fire resistance and dimensional stability of the gypsum plus certain enhancements (particularly strength and toughness) contributed by the substance of the host particle.

According to a preferred embodiment of the invention, the host particle is a paper fiber. The process for making a composite gypsum/wood-fiber material, according to the invention, begins with mixing between about 0.5% to about 30%, and preferably between about 3% to 20%, by weight (based on the total solids), wood fibers with the respective complement of ground, but uncalcined, gypsum. The dry mix is combined with enough liquid, preferably water, to form a dilute slurry having about 70%–95% by weight water. The slurry is heated in a pressure vessel at a temperature sufficient to convert the gypsum to calcium sulfate hemihydrate. It is desirable to continuously agitate the slurry with gentle stirring or mixing to break up any fiber clumps and keep all the particles in suspension. After the hemihydrate has precipitated out of solution and formed acicular alpha hemihydrate crystals, the pressure on the product slurry is relieved when the slurry is discharged from the autoclave, and the wax emulsion is added. While still hot, the slurry is discharged through a head box onto a continuous felting conveyor, such as the type used in paper making operations, to form a filter cake and remove as much uncombined water as possible. The wax emulsion is added to the slurry, along with selected process modifying or property enhancing additives, such as accelerators, retarders, weight reducing fillers, etc. before the slurry is passed through the head box onto the felting conveyor on which a filter cake is formed. As much as 90% of the water can be removed from the filter cake by the felting conveyor. As a consequence of the water removal, the filter cake is cooled to a temperature at which rehydration may begin. However, it may still be necessary to provide additional external cooling to bring the temperature low enough to accomplish the rehydration within an acceptable time.

Before extensive rehydration takes place, the filter cake is preferably wet pressed into a board of desired thickness and/or density. If the board is to be given a special surface texture or a laminated surface finish, it would preferably occur during or following this step of the process. During the wet pressing, which preferably takes place with gradually increasing pressure to preserve the product's integrity, two things happen. Additional water, for example about 50–60% of the remaining water, is removed. As a consequence of the additional water removal, the filter cake is further cooled to a temperature at which rapid rehydration occurs. The calcium sulfate hemihydrate hydrates to gypsum, so that the acicular calcium sulfate hemihydrate crystals are converted to gypsum crystals in situ in and around the wood fibers. After some rehydration, the boards can be cut and trimmed, if desired, and then, after complete rehydration, sent through a kiln for drying. Preferably, the drying temperature should be kept low enough to avoid recalcining any gypsum on the surface, but high enough to cause the core temperature of the board to exceed the melting point of the wax, at least briefly.

In order to achieve the maximum improvement in water resistance, it is considered essential to use a wax emulsion which is stable in the GWF slurry at the temperature and in the chemical environment existent during the time the slurry is formed into a filter cake and dewatered. The stability of the wax emulsion is markedly enhanced by the use of a cationic emulsifier in the wax emulsion. It has been found that wax emulsions which are not sufficiently stable produce GWF boards with inferior water resistance. Such emulsions also tend to separate from the filter cake and deposit upon equipment. The wax selected for the emulsion should have a melting point low enough that it will melt and thoroughly disperse throughout the GWF board as the board is dried.

A composite gypsum/wood-fiber board made according to thee foregoing process offers a GWF board having improved water resistance as well as the synergistic combination of desirable features offered by the prior art boards, e.g. the boards made by the process of U.S. Pat. No. 5,320,677. Because the board of the present invention has improved water resistance, it offers improved strength, including nail and screw pull-out resistance, over conventional plasterboard and prior art gypsum/wood fiber boards. Moreover, it can be produced over a range of density and thickness.

These and other features and advantages of the invention will be apparent to those skilled in the art following the more detailed discussion of the invention which follows.

DETAILED DESCRIPTION OF THE PRESENT INVENTION

The basic process begins by mixing uncalcined gypsum and host particles (e.g. wood or paper fibers) with water to form a dilute aqueous slurry. The source of the gypsum may be from raw ore or from the by-product of a flue-gas-desulphurization or phosphoric-acid process. The gypsum should be of a relatively high purity, i.e., preferably at least about 92–96%, and finely ground, for example, to 92–96% -minus 100 mesh or smaller. Larger particles may lengthen the conversion time. The gypsum can be introduced either as a dry powder or via an aqueous slurry.

The host particle is preferably a cellulosic fiber which may come from waste paper, wood pulp, wood flakes, and/or another plant fiber source. It is preferable that the fiber be one that is porous, hollow, split and/or rough surfaced such that its physical geometry provides accessible intersticies or voids which accommodate the penetration of dissolved calcium sulfate. In any event the source, for example, wood pulp, may also require prior processing to break up clumps, separate oversized and undersized material, and, in some cases, pre-extract strength retarding materials and/or contaminants that could adversely affect the calcination of the gypsum; such as hemi-celluloses, acetic acid, etc.

The ground gypsum and wood fibers are mixed with sufficient water to make a slurry containing about 5–30% by weight solids, although slurries containing about 5–20% by weight solids are preferred The solids in the slurry should comprise from about 0.5% to 30% by weight of wood fibers and preferably from about 3% to 20% wood fibers, the balance being mainly gypsum.

CONVERSION TO HEMIHYDRATE

The slurry is fed into a pressure vessel equipped with a continuous stirring or mixing device. Crystal modifiers, such as organic acids, can be added to the slurry at this point, if desired, to stimulate or retard crystallization or to lower the calcining temperature. Steam is injected into the vessel to bring the interior temperature of the vessel up to between about 212° F. (100° C.) and about 350° F. (177° C.), and autogeneous pressure; the lower temperature being approximately the practical minimum at which the calcium sulfate dehydrate will calcine to the hemihydrate state within a reasonable time; and the higher temperature being about the maximum temperature for calcining hemihydrate without undue risk of causing some the calcium sulfate hemihydrate to convert to anhydrite. The autoclave temperature is preferably on the order of about 285° F. (140° C.) to 305° F. (152° C.).

When the slurry is processed under these conditions for a sufficient period of time, for example on the order of 15 minutes, enough water will be driven out of the calcium sulfate dihydrate molecule to convert it to the hemihydrate molecule. The solution, aided by the continuous agitation to keep the particles in suspension, will wet out and penetrate the open voids in the host fibers. As saturation of the solution is reached, the hemihydrate will nucleate and begin forming crystals in, on and around the voids and along the walls of the host fibers.

It is believed that during the autoclaving operation, the dissolved calcium sulfate penetrates into the voids in the wood fibers and subsequently precipitates as acicular hemihydrate crystals within, on and about the voids and surfaces of the wood-fibers. When the conversion is complete, the pressure on the autoclave is reduced, desired additives, including the wax emulsion, are introduced, typically at the head box, and the slurry is discharged onto a dewatering conveyor. Conventional additives including accelerators, retarders, preservatives, fire retardants and strength enhancing agents may be added to the slurry at this point in the process. It has been found that certain additives, such as the particular accelerator (to speed the hydration of the calcium sulfate hemihydrate to gypsum) may markedly affect the level of improvement in water resistance achieved by the wax emulsion. As a result, potash is preferred as the accelerator over alum and other materials.

THE WAX EMULSION

The present invention broadly contemplates the addition of sufficient wax, in the form of a stable emulsion, to the slurry to create a product having at least about 1% by weight of wax distributed throughout the product. The present invention contemplates the use of any wax or combination of waxes although paraffin waxes are favored to make up the wax emulsion. The wax emulsion used in the present invention preferably comprises a combination of a paraffinic hydrocarbon, montan wax, polyvinyl alcohol and water; and may contain additives conventionally employed in emulsions, including emulsifiers to assist in formation of the emulsion and stabilizers to assist in stabilization of the emulsion. A suitable nonionic wax emulsion of this type is available from Bakor, Inc. under the tradename Aqualite 71, which contains a composite of waxes reported to have a melting point of 167° F. (75° C.). The following commercial paraffin waxes also may be used:

Gypseal II by Conoco
Aqualite 70 by Bakor
DeWax PAR-40 by Deforest Enterprises
MICHEM 955 by Michelman The paraffinic wax preferably has a melting point of 40° to 80° C. If the melting point is above 80° C., it becomes necessary to use a high drying temperature in the manufacture of conventional gypsum wallboard and this results in poor water resistance in the wallboard. If the melting point is below 40° C. the quality of the resulting gypsum board is inferior.

Montan wax, also known as lignite wax, is a hard, naturally occurring wax, dark to amber in color. It is insoluble in water but soluble in solvents such as carbon tetrachloride, benzene and chloroform. The montan wax is employed in an amount of about 1 to 200 parts, preferably about 1 to 50 parts, by weight, per 100 parts of the paraffinic hydrocarbon.

The polyvinyl alcohol is usually prepared by hydrolysis of polyvinyl acetate and is preferably a substantially completely hydrolyzed polyvinyl acetate. Suitably it should be at least 90% hydrolyzed polyvinyl acetate and preferably 97 to 100% hydrolyzed polyvinyl acetate. Suitably the polyvinyl alcohol is soluble in water at elevated temperatures of about 60° C. to about 95° C., but is insoluble in cold water. The polyvinyl alcohol is employed in an amount of about 1 to 50, preferably 1 to 20 parts, by weight, per 100 parts of the paraffinic wax. The polyvinyl alcohol provides adhesive characteristics as well as enhancing the water resistance.

The water which forms the aqueous vehicle of the emulsion is normally employed in an amount of 35 to 80%, preferably 50 to 60%, by weight, of the emulsion.

Conventional emulsifiers which may be added to the wax to form the emulsion include nonionic surfactants such as alkylphenoxypoly(ethyleneoxy)ethanols, sorbitan fatty acid esters and polyoxyethylene sorbitan fatty acid esters, anionic surfactants such as saponified fatty acids, and cationic surfactants, discussed below, which are typically employed in an amount of 0.1 to 5%, by weight, of the emulsion. Conventional stabilizers which may be added to the wax emulsion include alkali metal or ammonium hydroxides which are typically employed in an amount of 0.1 to 1%, by weight, of the emulsion.

In the present invention, a cationic emulsifier is preferably included in the emulsion. The cationic emulsifier may be the sole emulsifier or it may be used in combination with other emulsifiers. A particularly preferred cationic emulsifier is the quaternary amine surfactant sold by ICI Surfactants under the trade name G-265. Other useful cationic emulsifiers include the quaternary ammonium chlorides Tomah Q-17-2 (sold by Tomah Products, Inc.) and Ethoquad C/25 (sold by AKZO Chemicals, Inc.). The chemical formula of the Q-17-2 is as follows:

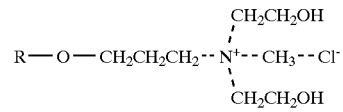

The addition of the cationic surfactants, described above, as the sole emulsifier or in combination with other conventional emulsifiers in the wax emulsion, promotes the stability of the wax emulsion under the high temperatures employed to produce the board of the present invention. It has been found that under some conditions the wax emulsion, which does not include the cationic surfactant, may break and allow wax particles to agglomerate, which results in the filter cake sticking to the forming equipment and diminishes the water resistance of the resulting board. It is theorized that the addition of the cationic surfactant improves the retention of the wax in the filter cake and in the resulting board because the positivley charged wax/cationic surfactant is attracted to the negatively charged wood fiber surface.

The wax emulsion may be prepared by heating the paraffinic hydrocarbon and the montan wax to the molten state and blending them together. A hot aqueous solution of the polyvinyl alcohol containing the emulsifiers and stabilizers is passed with the hot blend of the paraffin and montan wax through a colloid mill and the resulting emulsion is allowed to cool. Other types of equipment and procedures for preparing the emulsion can be used.

The wax emulsion is added to the aqueous slurry of gypsum/wood fiber and mixed with the slurry in proportions to provide from 0.5 to 20 parts, and preferably from about 1 to 3 parts, by weight of the wax solids per 100 parts of gypsum. Other ingredients such as foaming agents, dispersing agents and set accelerators may be included in the slurry. It has been found that between 65 and 90% of the wax from the emulsion added to the slurry is retained on the gypsum/wood fiber product, the balance being lost in the dewatering step of the process. The wax solids content of the wax emulsion added to the slurry is not critical.

The wax emulsion is preferably added to the blurry after it has been released from the autoclave, preferably prior to the head box, in order to provide sufficient time for the wax emulsion to thoroughly mix with the slurry prior to the formation of the filter cake and the dewatering step of the process. The temperature of the slurry at the time the wax emulsion is added is not critical, but it is essential that the wax emulsion be stable under the conditions of the slurry. In some embodiments, the temperature of the slurry may be high enough to maintain the calcium sulfate hemihydrate crystals. In any case, the wax emulsion must; be stable at the temperature of the slurry at the time the wax emulsion is mixed with the gypsum-wood fiber slurry and the wax emulsion must remain stable in the presence of the additives, such as accelerators, that are present in the slurry. The wax emulsion must remain stable through the dewatering and board formation steps as well, but it is important that a high proportion of the wax be retained in the filter cake throughout the dewatering and board formation.

DEWATERING

The hot wax-containing slurry is passed through the head box which distributes the slurry onto a flat porous forming surface to produce a filter cake. The filter cake is dewatered by the evaporation of water when the slurry is released from the autoclave and by the water in the slurry passing through the porous forming surface, preferably aided by vacuum. Although the dewatering causes cooling of the filter cake, additional external cooling may be applied during the dewatering step. As much of the water is removed as possible while the temperature of the product slurry is still relatively high and before the hemihydrate is substantially converted into gypsum. As much as 90% of the slurry water is removed in the dewatering device, leaving a filter cake of approximately 35% water by weight. At this stage the filter cake preferably consists of wood fibers interlocked with rehydratable calcium sulfate hemihydrate crystals and can still be broken up into individual composite fibers or nodules, shaped, cast, or compacted to a higher density.

The formation of the filter cake, the dewatering of the filter cake is preferably carried out using paper making equipment of the type described in U.S. Pat. No. 5,320,677, which is made a part of this disclosure.

PRESSING AND REHYDRATION

The dewatered filter cake is preferably wet-pressed for a few minutes to further reduce the water content and to compact the filter cake into the desired shape, thickness and/or density before substantial rehydration of the hemihydrate occurs. Although the extraction of the bulk of the water in the dewatering step will contribute significantly to lowering the filter cake temperature, additional external cooling may be required to reach the desired rehydration temperature within a reasonable time. The temperature of the filter cake is preferably reduced to below about 120° F. (49° C.) so that relatively rapid rehydration can take place. The rehydration recrystallizes the alpha hemihydrate crystals into acicular gypsum crystals in place, physically interlocked with the wood fibers.

Depending on the accelerators, retarders, crystal modifiers, or other additives provided in the slurry, hydration may take from only a few minutes to an hour or more. Because of the interlocking of the acicular hemihydrate crystals with the wood-fibers, and the removal of most of the carrier liquid from the filter cake, migration of the calcium sulfate is averted, leaving a homogeneous composite. The rehydration effects recrystallization of the hemihydrate crystals to dihydrate crystals in situ, i.e. within and about the voids of the wood fibers, thereby preserving the homogeneity of the composite. The crystal growth also connects the calcium sulfate crystals on adjacent fibers to form an overall crystalline mass, enhanced in strength by the reinforcement of the wood fibers.

When the hydration is complete, it is desirable to promptly dry the composite mass to remove the remaining free water. Otherwise, the hygroscopic wood fibers tend to hold, or even absorb, uncombined water which will later evaporate. If the calcium sulfate coating is fully set before the extra water is driven off, the fibers may shrink and pull away from the gypsum when the uncombined water does evaporate. Therefore, for optimum results it is preferable to remove as much excess free water from the composite mass as possible before the temperature drops below the level at which hydration begins.

DRYING

The pressed board, which typically contains about 30% by weight of free water, is then promptly dried at a relatively high temperature in order to reduce the free water content to about 0.5% or less in the final product. During the drying step it is important to raise the internal temperature of the final product high enough, for a short period of time, to thoroughly melt the wax. Obviously, drying conditions which tend to calcine the gypsum should be avoided. It has been found that it is desirable to carry out the drying under conditions in which the product achieves a core temperature of at least 170° F. (77° C.), and preferably a core temperature between about 170° F. (77° C.) and 200° F. (93° C.). The set and dried board can be cut and otherwise finished to desired specification.

When finally set, the unique composite material exhibits desired properties contributed by both of its two components. The wood fibers increase the strength, particularly flexural strength, of the gypsum matrix, while the gypsum acts as a coating and binder to protect the wood fiber, impart fire resistant and decrease expansion due to moisture.

The following examples will serve to illustrate the preparation and testing of gypsum/wood fiber products with improved water resistance of the present invention, but it is understood that these examples are set forth for illustrative purposes and that many other gypsum wood fiber products having improved water resistance may be made using suitable variations.

EXAMPLE 1

A standard GWF board product is produced as follows: A mixture of 92% by weight of an uncalcined FGD gypsum (the by-product of flue gas desulphurization) and 8% by weight of corrugated paper fiber pulp is added to a stirred autoclave with enough water to create a slurry having 15% by weight solids. The resulting slurry is heated under pressure to about 295° F. for 15 minutes, which allows the gypsum to be calcined to form alpha hemihydrate.

The pressure in the slurry is released as the slurry is discharged from the autoclave. The resulting evaporation of water cools the slurry to about 180 to 212° F. Accelerators are added to the slurry which is then fed to the head box of the forming line. The accelerators were 2% by weight of $K_2SO_4$ (Potash) and 2% by weight of a sugar coated calcium sulfate dihydrate (as described, for example, in U.S. Pat. No. 3,813,312), based on the weight of the gypsum. The slurry is distributed onto a porous conveyor on which a filter cake is formed. The filter cake is passed through a vacuum dewatering device which removes about 80% of the water and the slurry/fifter cake reaches a temperature of about 120° F. The filter cake is pressed into a board approximately 0.3 inch thick as it is subjected to further vacuum treatment to remove more water and cool the board to about 95° F., for best rehydration of the hemihydrate to gypsum. After rehydration, the board is cut into panels and the panels are dried under conditions which cause the core of the board reach about 200° F. for a short period of time. The resulting panels are then tested, as is reported below.

EXAMPLE 2

A stabilized wax emulsion is prepared as follows. A solution is formed by mixing 10 parts by weight of a cationic surfactant (G-265) with 90 parts by weight of water with stirring. This solution is added to a wax emulsion (Bakor-Aqualite 71) at a weight ratio of 100 to 1000. This provides a stabilized wax emulsion which contains:

| | |
|---|---|
| Active components of Aqualite | 37% |
| Cationic surfactant | 1% |
| Water | 62% |

EXAMPLE 3

A board, prepared in accordance with Example 1, was compared to a board made under the same conditions, but in which the wax emulsion of Example 2 was added to the slurry, prior to the head box, in a quantity sufficient to provide 3% by weight of wax solids for each pound of gypsum. Samples of both boards were tested for water absorption, density and strength. The results of the test, reported below show not only that the water absorption was markedly decreased but that the strength of the board was improved by the addition of the wax emulsion.

TABLE 1

| % wax used | Water Absorption % weight gain | Density (pcf) | Strength (psi) |
|---|---|---|---|
| 0% | 39% | 66.8 | 1123 |
| 0% | 3.5% | 66.2 | 1221 |

Water absorption, density and strength measurements were taken from 14 specimens of each of five boards, and the average of the 70 measurements is reported in Table 1. The Water Absorption, reported in Table 1, determined following ASTM test C-473 method, which is based on full immersion of the specimens for 2 hours. The weight of each specimen before and after immersion was used to calculate the weight gain. Density was determined by dividing the measured weight by the measured volume, while strength was determined as modulus of rupture ("MOR") according to the ASTM D1037 test method.

EXAMPLE 4

A board, prepared in accordance with Example 1, except that a commercial wax emulsion (Bakor Aqualite 71) was added to the slurry prior to the head box in a quantity sufficient to provide 2% by weight of wax solids for each pound of gypsum. Analysis of the resulting board showed that approximately 1.7% by weight of wax, based on the weight of the gypsum, was retained in the finished, dry board.

The forms of invention shown and described herein are to be considered only as illustrative. It will be apparent to those skilled in the art that numerous modifications may be made therein without departing from the spirit of the invention and the scope of the appended claims.

I claim:

1. A process for making a gypsum board product having improved water resistance which comprises:

forming an aqueous slurry of a calcium sulfate material selected from the group consisting of calcium sulfate hemihydrate, calcium sulfate anhydrite and mixtures thereof, and host particles each having voids penetratable by the slurry menstruum over a substantial portion of their bodies, said slurry containing at least about 70% by weight of water;

forming an aqueous emulsion of wax with a cationic surfactant, said emulsion being stable under the conditions in which calcium sulfate hemihydrate crystals are maintained;

adding said wax emulsion to said aqueous slurry, while said slurry is at a temperature at which calcium sulfate hemihydrate crystals are maintained;

passing said wax-containing slurry onto a flat porous forming surface to form a filter cake before the temperature of said filter cake falls below the temperature at which the calcium sulfate hemihydrate rapidly rehydrates to calcium sulfate dihydrate;

removing a substantial portion of the water from said filter cake through said porous forming surface and cooling said filter cake to a temperature at which rehydration begins, pressing said filter cake to form a board and remove additional water whereby calcium sulfate hemihydrate crystals about said host particles rehydrate in situ to calcium sulfate dihydrate crystals; and drying said board to remove the remaining free water and to cause the core of said board to reach a temperature sufficient to melt said wax.

2. The process as described in claim 1, wherein the quantity of wax emulsion added to said slurry is sufficient to provide at least about 1% by weight of wax solids to said slurry, based on the weight of the calcium sulfate therein.

3. The process as described in claim 2, wherein the quantity of wax emulsion added to said slurry is sufficient to provide from about 1% to about 3% by weight of wax solids to said slurry, based on the weight of the calcium sulfate therein.

4. The process as described in claim 1, wherein said wax emulsion comprises a quaternary amine cationic surfactant.

5. The process as described in claim 1, wherein said wax emulsion comprises a paraffin wax.

6. The process as described in claim 5, wherein said wax emulsion comprises a mixture of paraffin wax, montan wax, and polyvinyl alcohol.

7. The process as described in claim 5, wherein said wax emulsion comprises a cationic surfactant.

8. The process as described in claim 5, wherein said wax emulsion comprises a quaternary amine cationic surfactant.

9. The process as described in claim 1, wherein the slurry comprises ground calcium sulfate material and discrete ligno-cellulosic host particles.

10. The process as described in claim 1, wherein the host particles are wood fibers selected from the group consisting of chemically refined wood pulp, mechanically refined wood pulp, thermo-mechanically refined wood pulp and combinations of the foregoing.

11. The process as described in claim 9, wherein the solids in the slurry comprise from about 0.5 to about 30% by weight wood fibers.

12. The process as described in claim 11, wherein the solids in the slurry comprise from about 3 to about 20% by weight wood fibers.

13. A process for making a gypsum/wood fiber board having improved water resistance, comprising:

mixing ground gypsum and host particles together with sufficient water to form a slurry containing at least about 70% by weight of water, said host particles each having voids on its surface and/or within its body penetrable by the slurry menstruum containing suspended and/or dissolved gypsum and said slurry being sufficiently dilute to substantially wet out the penetrable voids in the host particles and to foster the formation of acicular calcium sulfate alpha hemihydrate crystals when heated under pressure;

heating the slurry in a pressure vessel, with continuous agitation, to a temperature sufficient to calcine the gypsum to calcium sulfate alpha-hemihydrate;

maintaining the slurry at such temperature until at least some calcium sulfate hemihydrate has substantially crystallized in and about the voids in the host particles;

forming an aqueous emulsion of wax with a cationic surfactant, said emulsion being stable under the conditions in which calcium sulfate hemihydrate crystals are maintained;

adding said wax emulsion to said slurry while said slurry is at a temperature at which the calcium sulfate hemihydrate crystals are maintained;

passing said wax containing slurry onto a flat porous forming surface to form a filter cake before the temperature of said filter cake falls below the temperature at which the calcium sulfate hemihydrate crystals rapidly rehydrate to dihydrate crystals;

cooling said filter cake to a temperature at which rehydration begins;

pressing said filter cake to form a board and to remove additional water therefrom whereby calcium sulfate hemihydrate crystals in and about the voids in the host particles rehydrate to form calcium sulfate dihydrate crystals; and drying the board to remove the remaining free water from said board and cause the temperature of the core of said board to reach the melting point of said wax.

14. The process as described in claim 13, wherein the quantity of wax emulsion added to said slurry is sufficient to provide at least about 1% by weight of wax solids to said slurry, based on the weight of the calcium sulfate therein.

15. The process as described in claim 14, wherein the quantity of wax emulsion added to said slurry is sufficient to provide from about 1% to about 3% by weight of wax solids to said slurry, based on the weight of the calcium sulfate therein.

16. The process as described in claim 13, wherein said wax emulsion comprises a quaternary amine cationic surfactant.

17. The process as described in claim 13, wherein said wax emulsion comprises a paraffin wax.

18. The process as described in claim 17, wherein said wax emulsion comprises a mixture of paraffin wax, montan wax, and polyvinyl alcohol.

19. The process as described in claim 17, wherein said wax emulsion comprises a cationic surfactant.

20. The process as described in claim 17, wherein said wax emulsion comprises a quaternary amine cationic surfactant.

21. The process as described in claim 13, wherein the dilute slurry comprises ground gypsum and discrete lignocellulosic host particles, said cellulosic particles each having voids penetrable by the slurry menstruum over a substantial portion of their bodies.

22. The process as described in claim 13, wherein the host particles are wood fibers selected from the group consisting of chemically refined wood pulp, mechanically refined wood pulp, thermo-mechanically refined wood pulp and combinations of the foregoing.

23. The process as described in claim 21, wherein the solids in the slurry comprise from about 0.5 to about 30% by weight wood fibers.

24. The process as described in claim 23, wherein the solids in the slurry comprise from about 3 to about 20% by weight wood fibers.

25. A gypsum/wood fiber board having improved water resistance, said board comprising the product of a process in which an aqueous slurry containing at least about 70% by weight of waters gypsum and host particles each having voids penetratable by the slurry menstruum over a substantial portion of their bodies is heated under conditions which foster the formation of acicular calcium sulfate alpha hemihydrate crystals in and about the voids in the host particles, said process comprising:

forming an aqueous emulsion of wax with a cationic surfactant, said emulsion being stable under the conditions in which calcium sulfate hemihydrate crystals are maintained;

adding said wax emulsion to said heated slurry, while said slurry is at a temperature at which the calcium sulfate hemihydrate crystals are maintained, said emulsion being stable under the conditions in which the calcium sulfate hemihydrate crystals are maintained;

passing said wax-containing slurry onto a flat porous forming surface to form a filter cake before the temperature of said filter cake falls below the temperature at which the calcium sulfate hemihydrate crystals rapidly rehydrate to calcium sulfate dihydrate crystals;

removing a substantial portion of the water from said filter cake and cooling said filter cake to a temperature at which rehydration begins, pressing said filter cake to form a board and remove additional water whereby calcium sulfate hemihydrate crystals in and about the voids in the host particles rehydrate in situ to form calcium sulfate dihydrate crystals; and drying said board to remove the remaining free water and to cause the core of said board to reach a temperature sufficient to melt said wax.

26. The process as described in claim 25, wherein the quantity of wax emulsion added to said slurry is sufficient to provide at least about 1% by weight of wax solids to said slurry, based on the weight of the calcium sulfate therein.

27. The process as described in claim 26, wherein the quantity of wax emulsion added to said slurry is sufficient to provide from about 1% to about 3% by weight of wax solids to said slurry, based on the weight of the calcium sulfate therein.

28. The process as described in claim 25, wherein said wax emulsion comprises a quaternary amine cationic surfactant.

29. The process as described in claim 25, wherein said wax emulsion comprises a paraffin wax.

30. The process as described in claim 29, wherein said wax emulsion comprises a mixture of paraffin wax, montan wax, and polyvinyl alcohol.

31. The process as described in claim 29, wherein said wax emulsion comprises a cationic surfactant.

32. The process as described in claim 29, wherein said wax emulsion comprises a quaternary amine cationic surfactant.

33. The process as described in claim 26, wherein the slurry comprises ground gypsum and discrete lignocellulosic host particles.

34. The process as described in claim 26, wherein the host particles are wood fibers selected from the group consisting of chemically refined wood pulp, mechanically refined wood pulp, thermo-mechanically refined wood pulp and combinations of the foregoing.

35. The process as described in claim 33, wherein the solids in the slurry comprise from about 0.5 to about 30% by weight wood fibers.

36. The process as described in claim 35, wherein the solids in the slurry comprise from about 3 to about 20% by weight wood fibers.

37. A gypsum/wood fiber board having improved water resistance, said board comprising the product of:

mixing ground gypsum and host particles together with sufficient water to form a slurry containing at least about 70% by weight water, said host particles each having voids on its surface and/or within its body penetrable by the slurry menstruum containing suspended and/or dissolved gypsum and said slurry being sufficiently dilute to substantially wet out the penetrable voids in the host particles and to foster the formation of acicular calcium sulfate alpha hemihydrate crystals when heated under pressure;

heating the slurry in a pressure vessel, with continuous agitation, to a temperature sufficient to calcine the gypsum to calcium sulfate alpha-hemihydrate;

maintaining the slurry at such temperature until at least some calcium sulfate hemihydrate has substantially crystallized in and about the voids in the host particles;

forming an aqueous emulsion of wax with a cationic surfactant, said emulsion being stable under the conditions in which calcium sulfate hemihydrate crystals are maintained;

adding said wax emulsion to said slurry while said slurry is at a temperature at which the calcium sulfate hemihydrate crystals are maintained, said emulsion being stable under the conditions in which the calcium sulfate hemihydrate crystals are maintained;

passing said wax containing slurry onto a flat porous forming surface to form a filter cake before the temperature of said filter cake falls below the temperature at which the calcium sulfate hemihydrate crystals rapidly rehydrate to dihydrate crystals;

cooling said filter cake to a temperature at which rehydration begins;

pressing said filter cake to form a board and to remove additional water therefrom, whereby calcium sulfate hemihydrate crystals in and about the voids in the host particles rehydrate to form calcium sulfate dihydrate crystals; and drying the board to remove the remaining free water from said board and cause the temperature of the core of said board to reach the melting point of said wax.

38. The board as described in claim 37, wherein the quantity of wax emulsion added to said slurry is sufficient to provide at least about 1% by weight of wax solids to said slurry, based on the weight of the calcium sulfate therein.

39. The board as described in claim 38, wherein the quantity of wax emulsion added to said slurry is sufficient to provide from about 1% to about 3% by weight of wax solids to said slurry, based on the weight of the calcium sulfate therein.

40. The board as described in claim 38, wherein said wax emulsion comprises a quaternary amine cationic surfactant.

41. The board as described in claim 38, wherein said wax emulsion comprises a paraffin wax.

42. The board as described in claim 41, wherein said wax emulsion comprises a mixture of paraffin wax, montan wax, and polyvinyl alcohol.

43. The board as described in claim 41, wherein said wax emulsion comprises a cationic surfactant.

44. The board as described in claim 41, wherein said wax emulsion comprises a quaternary amine cationic surfactant.

45. The board as described in claim 37, wherein the dilute slurry comprises ground gypsum and discrete lignocellulosic host particles, said cellulosic particles each having voids penetrable by the slurry menstruum over a substantial portion of their bodies.

46. The board as described in claim 37, wherein the host particles are wood fibers selected from the group consisting of chemically refined wood pulp, mechanically refined wood pulp, thermo-mechanically refined wood pulp and combinations of the foregoing.

47. The board as described in claim 45, wherein the solids in the slurry comprise from about 0.5 to about 30% by weight wood fibers.

48. The board as described in claim 47, wherein the solids in the slurry comprise from about 3 to about 20% by weight wood fibers.

49. A gypsum/wood fiber board having improved water resistance, said board comprising a major amount of a calcium sulfate material and a minor amount of host particles, by weight, and having a wax uniformly distributed throughout, said board being the product of the process comprising:

preparing a dilute aqueous slurry of a calcium sulfate material selected from the group consisting of calcium sulfate hemihydrate, calcium sulfate anhydrite and mixtures thereof, and host particles each having voids penetratable by the slurry menstruum over a substantial portion of their bodies, said slurry containing at least about 70% by weight of water;

heating said slurry to a temperature at which calcium sulfate hemihydrate crystals are maintained;

forming an aqueous emulsion of wax with a cationic surfactant, said emulsion being stable under the conditions in which calcium sulfate hemihydrate crystals are maintained;

adding said wax emulsion to said slurry;

passing said wax-containing slurry onto a flat porous forming surface to form a filter cake and remove water therefrom;

pressing said filter cake to form a board and to remove additional water therefrom; and drying the board to remove the remaining free water from said board and cause the temperature of the core of said board to reach the melting point of said wax.

50. The board as described in claim 49, wherein said board comprises at least about 1% by weight of wax, based on the weight of the calcium sulfate therein.

51. The board as described in claim 50, wherein said board comprises from about 1% to about 3% by weight of wax, based on the weight of the calcium sulfate therein.

52. The board as described in claim 49, wherein said wax comprises a paraffin wax.

53. The board as described in claim 52, wherein said wax emulsion comprises a mixture of paraffin wax, montan wax, and polyvinyl alcohol.

54. The board as described in claim 49, wherein the host particles are wood fibers selected from the group consisting of chemically refined wood pulp, mechanically refined wood pulp, thermo-mechanically refined wood pulp and combinations of the foregoing.

55. The board as described in claim 54, wherein the solids in the slurry comprise from about 0.5 to 30% by weight wood fibers.

56. The board as described in claim 55, wherein the solids in the slurry comprise from about 3 to about 20% by weight wood fibers.

* * * * *